United States Patent [19]

Tada et al.

[11] Patent Number: 5,094,173
[45] Date of Patent: Mar. 10, 1992

[54] SUPERCONDUCTING MAGNETIC LEVITATED TRAIN, TRAIN SYSTEM METHOD OF CONTROLLING THE SAME, AND SUPERCONDUCTING COIL FOR MAGNETIC LEVITATED TRAIN

[75] Inventors: Naofumi Tada; Fumio Iida, both of Hitachi; Ryukichi Takahashi, Hitachiota, all of Japan

[73] Assignee: Hitachi, Ltd., Tokyo, Japan

[21] Appl. No.: 664,116

[22] Filed: Mar. 4, 1991

[30] Foreign Application Priority Data

Mar. 2, 1990 [JP] Japan .................................. 2-49295

[51] Int. Cl.$^5$ ............................................. B61B 3/00
[52] U.S. Cl. ..................... 104/282; 104/292; 104/281
[58] Field of Search ............... 104/281, 282, 285, 286, 104/290, 292, 294; 318/135; 505/902, 903, 904, 905, 908

[56] References Cited

U.S. PATENT DOCUMENTS

| | | | |
|---|---|---|---|
| 3,820,471 | 6/1974 | Maki et al. | 104/285 |
| 3,890,906 | 6/1975 | Maki | 505/905 |
| 3,927,735 | 12/1975 | Miericke et al. | 104/285 |
| 3,937,150 | 2/1976 | Miericke et al. | 505/904 |
| 3,951,075 | 4/1976 | Miericke et al. | 104/281 |
| 4,273,054 | 6/1981 | Yamashita et al. | 104/281 |
| 4,549,156 | 10/1985 | Mine et al. | 104/285 |

Primary Examiner—Robert J. Oberleitner
Assistant Examiner—Mark T. Le
Attorney, Agent, or Firm—Antonelli, Terry, Stout & Kraus

[57] ABSTRACT

A superconducting magnetic levitated train and train system which includes a plurality of cars connected to each other, a group of superconducting magnets attached to the cars and a coil provided on the ground so that the superconducting magnetic levitated train is levitated by the magnetically induced repulsion between the superconducting magnets and the coil on the ground. The invention is characterized in that the superconducting magnet on a specified car has a predetermined stability margin which is larger than the stability margin of a superconducting magnet on the other cars. A method of controlling the superconducting magnetic levitated train which includes detecting a driven state of a superconducting magnet on a specified car and varying and controlling the travelling conditions for the train so that the stability margin of the superconducting magnet on the specific car is changed in accordance with the command from a train control. A superconducting coil for the superconducting magnetic levitated train includes a coil of a composite superconducting wire composed of multifilmentary NbTi wire having a low copper ratio. The outer surface thereof is coated with thin high-purity aluminum or the wire accommodates high-purity aluminum at the central portion of the cross section thereof.

12 Claims, 4 Drawing Sheets

SUPERCONDUCTING MAGNETIC LEVITATED TRAIN, TRAIN SYSTEM METHOD OF CONTROLLING THE SAME, AND SUPERCONDUCTING COIL FOR MAGNETIC LEVITATED TRAIN

FIELD OF THE INVENTION

The present invention relates to a superconducting magnetic levitated train, a superconducting magnetic levitated train system and a method of controlling the same. More particularly, the present invention relates to a superconducting magnetic levitated train and the method of controlling the same, a superconducting magnetic levitated train system and a superconducting coil used therefor which enable safe levitation of the train by allowing a large stability margin for the superconducting magnet on a specified car.

BACKGROUND OF THE INVENTION

A superconducting magnetic levitated train adopts a system in which a superconducting magnet is provided on the train and a normal conductive short-circuit coil on the ground side so that a current is applied to coil on the ground by electromagnetic induction caused when the magnetic flux of the superconducting magnet on the train cuts the coil on the ground at the time of starting the train, and the repulsive force between the superconducting magnet on the train and the coil on the ground levitates the train. The train is propelled by a linear synchronous motor system in which the thrust in the same direction is obtained by inverting the current of a propellant coil provided o the ground side separately from the normal conductive short-circuit coil by the interaction between the propellant coil and the superconducting magnet. Since such an induction current is utilized, no levitating force is obtained at the time of stop, and the levitation force is insufficient during low-speed travel, an auxiliary supporting device is required. However, levitation itself is naturally stable without the need for any control. In a superconducting magnet levitated train, since a strong magnetic field is obtained from the superconducting magnet on the train, the levitation height as large as about 100 mm can be realized. In addition, since the superconducting magnet is used in a permanent current mode, no power source for excitation is necessary on the train. On the other hand, a superconducting magnet suffers from a phenomenon of quenching in a normal conducting state, and a lightweight magnet having a high current density magnet such as a superconducting magnet for levitated trains involves a possibility of frequently quenching before the critical value of the superconducting wire is reached due to various disturbances. Since such a quench phenomenon is irreversible, once a quench phenomenon is produced, about 30 minutes is required for re-pouring a coolant to the superconducting magnet and exciting the magnet.

In a conventional superconducting magnetic levitated train such as shown in, for example, FIGS. 2 and 3 two superconducting magnets 2 are accommodated in one coolant container 3 and four coolant containers (eight superconducting magnets) are attached to a car truck 10 provided at the lower part of a car body 1 in each car. An auxiliary supporting device 7 supports the train at the time of stop and during a low-speed travel, while at a high-speed travel, the train is levitated by the repulsive force between a propellant guiding ground coil 4B, a supporting ground coil 4A and the superconducting magnets 2 on the train. Additionally, it is proposed that in a line for traffic experiment or in a traffic train in the near future, the car trucks 10 carrying the superconducting magnets 2 are gathered between the cars in order to reduce the magnetic field leaking from the superconducting magnets 2 to a passenger car.

In such a superconducting magnetic levitated train, when a specific superconducting magnet quenched during travel, the superconducting magnet situated at the symmetrical position is forced to be demagnetized so as to prevent the balance of the train as a whole from being lost by the levitation force at the part of the quenched superconducting magnet and the train is cause to safely travel and landed by an emergency landing device 8, as described in Japanese Patent Publication U.S. Pat. No. 1,376,957. U.S. Pat. No. 881,534 discloses a connecting system for preventing the loss of the balance on the left-hand and right-hand sides by modifying the arrangement of the group of superconducting magnets so that the S-pole, N-pole and S-pole are alternately disposed in the longitudinal direction of the train and the same poles are connected in series to each other.

For a superconducting wire in a conventional magnetic levitated train, multifilamentary NbTi wire having a low copper ratio is used in order to reduce the weight of a superconducting magnet and increase the current density of a superconducting coil, as described on 36 to 40 pages of "The Journal of the Japan Society of Mechanical Engineering", vol. 91, No. 835, June (1988). A Cu/NbTi wire containing 1.0 of Cu based on NbTi in cross sectional ratio (hereinunder referred to as "copper ratio") is known. Although a wire using aluminum in place of Cu or multifilamentary NbTi wire using aluminum in place of a part of Cu is proposed in order to reduce the weight, since such wire has a large aluminum cross sectional area, it is not used for a superconducting magnetic levitated train.

In any of the above-described prior art, the facts that when a specific superconducting magnet on the train quenches, the superconducting magnetic levitated train during high-speed travel must be suddenly stopped and that a long time is required for restoration are not taken into any consideration. Therefore, such a conventional superconducting magnetic levitated train is lacking in the reliability as a traffic train.

In addition, a superconducting coil composed of a wound multifilamentary NbTi wire having a low copper ratio, especially, a wire having a copper ratio of 1.0 is poor in the electromagnetic stability. If a magnetic levitated train with such a superconducting coil mounted thereon travels at a high speed, a superconducting coil on the train frequently quenches due to the increase in disturbance energy. In a wire using aluminum in place of Cu or a wire using aluminum in place of a part of Cu, a coil having a high current density is taken into almost no consideration, so that if it is mounted on a superconducting magnetic levitated train, the levitation force is inconveniently small.

Accordingly, it is an object of the present invention to eliminate the defects in the prior art and to provide a superconducting magnetic levitated train, a superconducting magnetic levitated train system and a method of controlling the same, and a superconducting coil for a magnetic levitated train which are unlikely to cause quench even during high-speed travel and which have a high reliability.

It is another object of the present invention to eliminate the defects in the prior art and to provide a highly reliable method of controlling a superconducting magnetic levitated train which controls a superconducting coil before it quenches by varying the stability margin of a superconducting magnet and the magnitude of a disturbance so as to prevent a quench phenomenon even during high-speed levitation.

To achieve this aim, in the present invention, the stability margin of a superconducting magnet on a specific car in which the disturbance energy is large on the basis of the fact that the disturbance energy applied to a superconducting magnet is different in cars.

The present invention provides a superconducting magnetic levitated train having a plurality of cars connected to each other, a group of superconducting magnets attached to the car trucks and a coil provided on the ground so that the superconducting magnetic levitated train is levitated by the magnetically induced repulsion between the superconducting magnets and the coil on the ground, characterized in that a superconducting magnet on a specific car has a predetermined stability margin which is larger than the stability margin of a superconducting magnet on the other cars.

The present invention also provides a method of controlling a superconducting magnetic levitated train having a plurality of cars connected to each other, a group of superconducting magnets attached to the car trucks and a coil provided on the ground so that the superconducting magnetic levitated train is levitated by the magnetically introduced repulsion between the superconducting magnets and the coil on the ground, the method comprising the steps of: detecting the driven state of a superconducting magnet on a specific car; varying and controlling the travelling conditions for the train so that the stability margin of the superconducting magnet on the specific car is changed in accordance with the command from a train control means by varying the current value in a permanent current mode by an auxiliary power source and a resistor; and making the stability of the margin of the superconducting magnet on the specific car larger than the stability margin of a superconducting magnet on the other cars by varying the stability margin of the superconducting magnet on at least one car.

In the present invention, it is possible to make the stability margins of the superconducting magnets on the lead car and the rearmost car larger than the stability margins of the superconducting magnets on the other cars therebetween. The present invention is more effective when the stability margin of a superconducting magnet mounted on a car is not less than 200 mJ/cc in rated drive.

Appropriate control carried out so that the stationary disturbance energy applied to a superconducting magnet on a car is restricted to not more than 100 mJ/cc is effective.

In the present invention, use of a superconducting coil composed of a wound composite superconducting wire which is stabilized by aluminum is effective. The composite superconducting wire which is stabilized by aluminum is multifilamentary NbTi wire having a low copper ratio with the outer surface thereof coated with thin high-purity aluminum or multifilamentary NbTi wire having a low copper ratio accommodating high-purity aluminum at the central part of the cross section thereof.

According to the present invention, it is possible that the stability margin is variable in correspondence with the disturbance energy which is different depending upon the position of the car. Furthermore, in a superconducting magnet on a specific car, a detector which is capable of detecting the magnitude of a disturbance, an auxiliary current source which is capable of varying the current value in a permanent current mode and a resistor are arranged, so that a centralized train control center provided on the ground can control the stability margins of the superconducting magnets or the speed of the train.

The "stability margin" in the present invention means the difference between a critical characteristic (temperature, magnetic field, current density) of a superconducting magnet and the operating point obtained when the magnet is actually used. The stability margin represents at least one parameter of the temperature, magnetic field and current density of the magnet by an energy per unit volume of the magnet (mJ/cc).

In contrast, a factor in the reduction of the travelling stability of a magnetic levitated train is a disturbance energy. Causes for a disturbance energy are the proximity of the train to a tunnel, the existence of a high-voltage steel tower and the like, and the disturbance energy produced by such a cause can be obtained by calculation at the time of designing the magnetic levitated train system. As a result of the investigation of the present inventor, it has been found that the stability margin of a superconducting magnet on a specific car which is required to enhance the stability must be so designed as to be constantly larger than the disturbance energy and that the effective difference between the former and the latter is not less than 50 mJ/cc, preferably not less than 100 mJ/cc.

If the superconducting magnet, the train and the system are so designed that the stability margin of the superconducting magnet is not less than 200 mJ/cc and the magnitude of the disturbance energy is not more than 100 mJ/cc, especially stable levitation is possible.

Generally, in order that a superconducting coil is stable at a certain operating point, it is necessary that the stability margin which the superconducting coil has is larger than the heat energy produced by the disturbance due to an electromagnetic energy or a mechanical energy, with respect to a superconducting magnetic levitated train, the stability margin and the heat energy produced by a disturbance were quantitatively calculated by experiments.

The superconducting coil for magnetic levitated train does not contain a helium cooling channel, in other words, it is what is called a closely wound coil. An epoxy resin is inserted between the turns of the winding for fixture. The winding is accommodated in a liquid helium tank which is called an inner tank, and a spacer is intermittently inserted between the winding and the inner tank so that the liquid helium exists in a space which corresponds to the thickness of the spacer.

It was experimentally made clear that the stability margin in such a coil structure allows a larger value than the heat capacity which is calculated by using an adiabatic stabilization model and which is determined by the temperature margin and the heat capacity of the superconducting wire. In other words, it is necessary to consider a dynamic stabilization model including the sectional area, the electric resistance and the thermal conductivity of a stabilizing material. Therefore, if the following improvements are adopted, the stability margin of a superconducting coil for a magnetic levitated train is increased.

(i) The current load factor to the superconducting wire of the superconducting coil is reduced (temperature margin is increased).

(ii) A stabilizing material having a large heat capacity at cryogenic temperature is used.

(iii) The sectional area of the stabilizing material is increased.

(iv) The electric resistance of the stabilizing material at cryogenic temperature is reduced.

(v) A stabilizing material having a high thermal conductivity at cryogenic temperature is used.

A material which satisfies the above-described conditions, which is light in weight and the current density of which can be enhanced as a composite superconducting wire which is stabilized aluminum. However, since aluminum is mechanically so soft that it is impossible to produce multifilamentary NbTi wire having aluminum for the whole matrix in the present wire working technique. It has been found that it is possible to greatly increase the stability margin by using a superconducting wire having Cu and aluminum for a composite matrix, wherein a slight amount of aluminum which enables plastic working of such a composite matrix wire suffices.

In a superconducting magnetic levitated train which travels at a super high speed and which has a plurality of connected cars, the kind and the magnitude of the disturbance applied to a superconducting magnet on the train will be inferred. As a disturbance applied to a general superconducting magnet, there are a movement of the superconducting wire, cracking of the epoxy resin between the turns of the windings and the deformation of the superconducting coil as a whole which are caused by an electromagnetic force produced by the excitation of a superconducting coil and which generate heat which resulting in the production of quench at not more than a rated value. These disturbances, however, can be detected by test before mounting the coil on the train as a problem at the time of winding. As the disturbances characteristic of a superconducting magnetic levitated train, generation of the alternating current loss produced on the superconducting coil by the fluctuating magnetic field from the coil on the ground, the increase in the heat ingress due to vibration and the generation of heat due to the impact load, vibration and wind pressure produced when the train enters a tunnel or the train passes another train will be considered. It is considerably difficult to quantify the magnitudes of these disturbance energies in the present state of art. It is, however, certain that the disturbance energy applied to a superconducting magnet is different depending upon the position of the car in a superconducting magnetic levitated train having a plurality of connected cars. This fact is one of the basis of the present invention. That is, a superconducting magnet on the lead car receives the largest disturbance energy, and it is the lead car and the rearmost car which are susceptible to the influence of the lowered levitation force at the time of quench. In the present invention, the car which is liable to receive a disturbance is specified and the stability margin of a superconducting magnet on the specified car is made larger than the stability margin of a superconducting magnet on other cars. In the present invention, a car which is susceptible to the influence of the lowered levitation force at the time of quench is discriminated and the stability margin of a superconducting magnet on the specified car is made larger than the stability margin of a superconducting magnet on other cars.

The concrete stability margin was calculated by experiment. Four kinds of superconducting wires having stabilizing materials having different sectional areas and different materials were respectively wound so as to have a cross section similar that of a superconducting coil for a magnetic levitated train and an epoxy resin was inserted between the turns of winding, thereby producing superconducting coils. In order to simulate a disturbance energy, a pulsating current was applied to a heater wire embedded in the winding in advance, thereby generating a thermal disturbance. In this way, the minimum energy necessary for quench was obtained by experiment. As a result, the stability margin of the coil of a conventional multifilamentary NbTi wire having a copper ratio of 1.0 was 100 mJ/cc at the rated value of the coil and it was found that the stationary disturbance energy (except a disturbance due to a non-stationary disaster such as earthquake, fire and explosion) applied to a superconducting magnet must be not more than 100 mJ/cc according to the results of the current test operations of a superconducting magnetic levitated train. From the results of the experiments on the stability margins of the coils of wires having different copper ratios, it was made clear that a stability margins of not less than 200 mJ/cc is necessary in order to secure the stable margin of a superconducting magnet on the train with a high reliability.

As is clear from the above explanation, the disturbance energy on a superconducting magnetic levitated train varies with the speed of the train, the position of the car and the environmental conditions of the travelling train. Another feature of the present invention is that the stability margin of each superconducting magnet is made variable in correspondence with temporally and spatially different disturbance energies. With respect to a spatially different disturbance energy, superconducting magnets having different stability margins are mounted at predetermined positions in advance. With respect to temporally different disturbance energies, it is necessary to detect the magnitude of the disturbance during high-speed travel and control the stability margins of the superconducting magnets on the train or the speed of the train. The control of the speed of the train is easily carried out by varying the frequency of the current which is applied to the propellant coil on the ground. For example, a method of reducing the disturbance energy applied to the superconducting magnets by reducing the speed of the train immediately before the train enters a tunnel or the train passes another train is effective. Furthermore, it is possible to control the coil current on the train in a permanent current mode by a centralized train control center provided on the ground.

By virtue of the features of the present invention, it is possible to safely drive the superconducting magnetic levitated train at a super high speed with the greatest efficiency by specifying a car which is susceptible to a disturbance and increasing the stability margin of the superconducting magnet mounted on the specified car.

The above and other objects, features and advantages of the present invention will become more apparent from the following description when taken in connection with the accompanying drawings which show, for

BRIEF DESCRIPTION OF THE DRAWINGS

FIG. 8 is a vertical sectional view of a superconducting magnetic levitated train;

DETAILED DESCRIPTION

Figure 4:
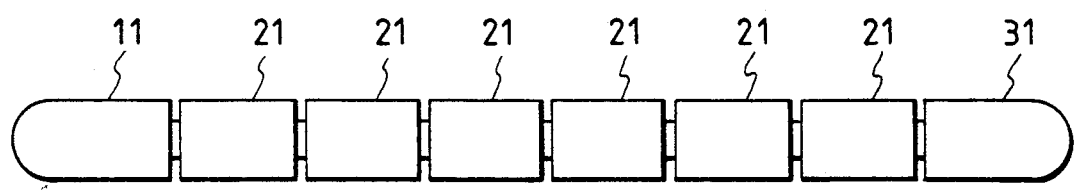
FIGS. 4 and 5 schematically show the structure of a superconducting magnetic levitated train according to the present invention.

Referring now to the drawings wherein like reference numerals are used throughout the various views to designate like parts and, more particularly, to FIG. 4, according to this figure, a superconducting magnetic levitated train of is provided including, for example, eight cars, namely, a lead car 11, 6 intermediate cars 21 and the rearmost car 31. The total length is about 200 m, the weight is about 180 tons and the maximum speed of the train is 500 km/h. The size of the lead car 11 is 28.0 m in length, 2.8 m in width and 2.65 m in height. The size of the intermediate car 21 is 21.6 m in length, 2.8 m in width and 2.65 m in height. The size of the rearmost car 31 is the same as that of the lead car 11. 4 superconducting magnets arranged in 2 poles×2 lines are disposed on the car truck at the connecting portion of each car. The superconducting magnets other than the superconducting magnet on the lead car 11 are of the same racetrack type, each having a length of 2.3 m and a width of 0.5 m, a polepitch of 2.7 m and a magnetomotive force of 700 kA. In the structure of the superconducting magnetic levitated train, the superconducting magnet on the lead car is a coil of a composite superconducting wire consisting of multifilamentary NbTi wire having a copper ratio of 1.0 with the outer surface thereof coated with high-purity aluminum having a thickness of 0.2 mm, and the superconducting magnet on the other cars is a coil multifilamentary NbTi wire having a copper ratio of 1.0, as in the prior art. The superconducting magnet on the lead car is of a racetrack type and the magnetomotive force thereof is 700 kA. It has been made clear that this structure produces a stability margin of 600 mJ/cc on the superconducting magnet on the lead car at the rated value, which is six times as large as the stability margin of the superconducting magnet on the other cars. As a result, it has been proved that the superconducting magnetic levitated train of this set does not quench even it is levitated at the maximum speed of 500 km/h, and it can withstand a disturbance caused when entering a tunnel or passing another train.

In this embodiment, although the weight of the lead car slightly increases and the sectional area of the coil increases so that the levitation force caused by the magnetically induced repulsion is slightly lowered, since a large lifting power is produced on the lead car when the train travels at as high a speed as 500 km/h, it is possible to obtain the levitation force which is balanced as a whole. Therefore, a highly reliable superconducting magnetic levitated train is realized without the need for changing the magnetomotive force of the superconducting magnet depending upon the position of the car.

In another embodiment of a superconducting magnetic levitated train in accordance with the present invention, the superconducting magnet on each car is of a racetrack type, each having a length of 2.3 m, a width of 0.5 m, a pole pitch of 2.7 m and a magnetomotive force of 700 kA.

In the structure of the superconducting magnetic levitated train, the superconducting magnet on the lead car and the rearmost car is a coil of a composite superconducting wire consisting of multifilamentary NbTi wire having a copper ratio of 0.8 which accommodates high-purity aluminum 0.2 in aluminum ratio at the central portion of the cross section thereof, and the superconducting magnet on the other cars is a coil of multifilamentary NbTi wire having a copper ratio of 1.0, as in the prior art. It has been made clear that this structure produces a stability margin of 200 mj/cc on the superconducting magnet on the lead car and the rearmost car at the rated value, which is twice as large as the stability margin of the superconducting magnet on the other cars. As a result, it has been proved that the superconducting magnetic levitated train of this set does not quench even it is levitated at the maximum speed of 500 km/h, and it can withstand a disturbance caused when entering a tunnel or passing another train.

In this embodiment, since it is possible to slightly reduce the weights of the lead car and the rearmost car than in the prior art and the cross sectional area of the coil is the same as in the prior art, a large levitation force is produced on the lead car and the rearmost car. It is therefore possible to reduce the magnetomotive force of the superconducting magnet on the lead car and the rearmost car in order to balance the superconducting magnetic levitated train as a whole which has a plurality of connected cars. Thus, this embodiment is advantageous in that it is possible to further increase the stability margin by reducing the magnetomotive force.

In accordance with yet another embodiment of a superconducting magnetic levitated train constructed in accordance with the present invention, the superconducting magnets other than the superconducting magnet on the lead car are of the same racetrack type, each having a length of 2.3 m and a width of 0.5 m, a pole pitch of 2.7 m and a magnetomotive force of 700 kA.

In the structure of the superconducting magnetic levitated train, the superconducting magnet on the lead car is multifilamentary NbTi wire having a copper ratio of 2.0, and the superconducting magnet on the other cars is a coil of multifilamentary NbTi wire having a copper ratio of 1.0, as in the prior art. The superconducting magnet on the lead car is of a racetrack type and the magnetomotive force thereof is 700 kA. It has been made clear that this structure produces a stability margin of 200 mJ/cc on the superconducting magnet on the lead car at the rated value, which is twice as large as the stability margin of the superconducting magnet on the other cars. As a result, it has been proved that the superconducting magnetic levitated train of this set does not quench even it is levitated at the maximum speed of 500 km/h, and it can withstand a disturbance caused when entering a tunnel or passing another train.

In this embodiment, although the weight of the lead car slightly increases and the sectional area of the coil increases so that the levitation force caused by the magnetically induced repulsion is slightly lowered, since a large lifting power is produced on the lead car when the train travels at as high a speed as 500 km/h, it is possible to obtain the levitation force which is balanced as a whole. Therefore, a highly reliable superconducting magnetic levitated train is realized without the need for changing the magnetomotive force of the superconducting magnet depending upon the position of the car.

In accordance with a further embodiment of a superconducting magnetic levitated train constructed in accordance with the present invention, the superconducting magnet on each car is of a racetrack type, each having a length of 2.3 m, a width of 0.5 m, a pole pitch of 2.7 m and a magnetomotive force of 700 kA.

Figure 5:
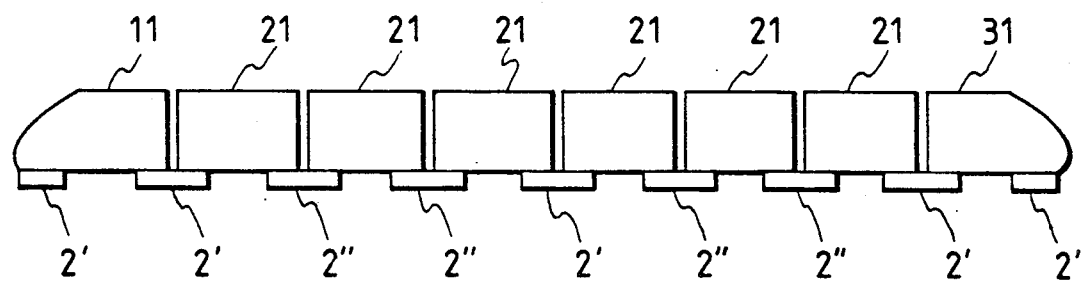

In the structure of the superconducting magnetic levitated train, the reference numerals 2, and 2'' in FIG. 5 are superconducting magnets, respectively. The superconducting magnets 2' and 2'' are provided with different stability with consideration of the magnitude of the disturbance applied to each superconducting magnet during high-speed travel of the superconducting magnetic levitated train and the case in which a superconducting magnet quenches due to a disturbance. The superconducting magnet 2' is a coil of a composite superconducting wire consisting of multifilamentary NbTi wire having a copper ratio of 0.8 which accommodates high-purity aluminum 0.2 in aluminum ratio at the central portion of the cross section thereof, and the superconducting magnet 2' is a coil of multifilamentary NbTi wire having a copper ratio of 1.0, as in the prior art. This structure can make the stability margin of the superconducting magnet 2' twice as large as the stability margin of the superconducting magnet 2''. As a result, it has been proved that the superconducting magnetic levitated train of this set does not quench even it is levitated at the maximum speed of 500 km/h, and it can withstand a disturbance caused when entering a tunnel or passing another train.

In this embodiment, since it is possible to slightly reduce the weights of the cars carrying the superconducting magnets 21 than that of the other cars and the cross sectional area of the coil is the same as in the prior art, a large levitation force is produced on cars carrying the superconducting magnets 21. It is therefore possible to reduce the magnetomotive force of the superconducting magnet 21 in order to balance the superconducting magnetic levitated train as a whole which has a plurality of connected cars. Thus, this embodiment is advantageous in that it is possible to further increase the stability margin by reducing the magnetomotive force.

Figure 6:
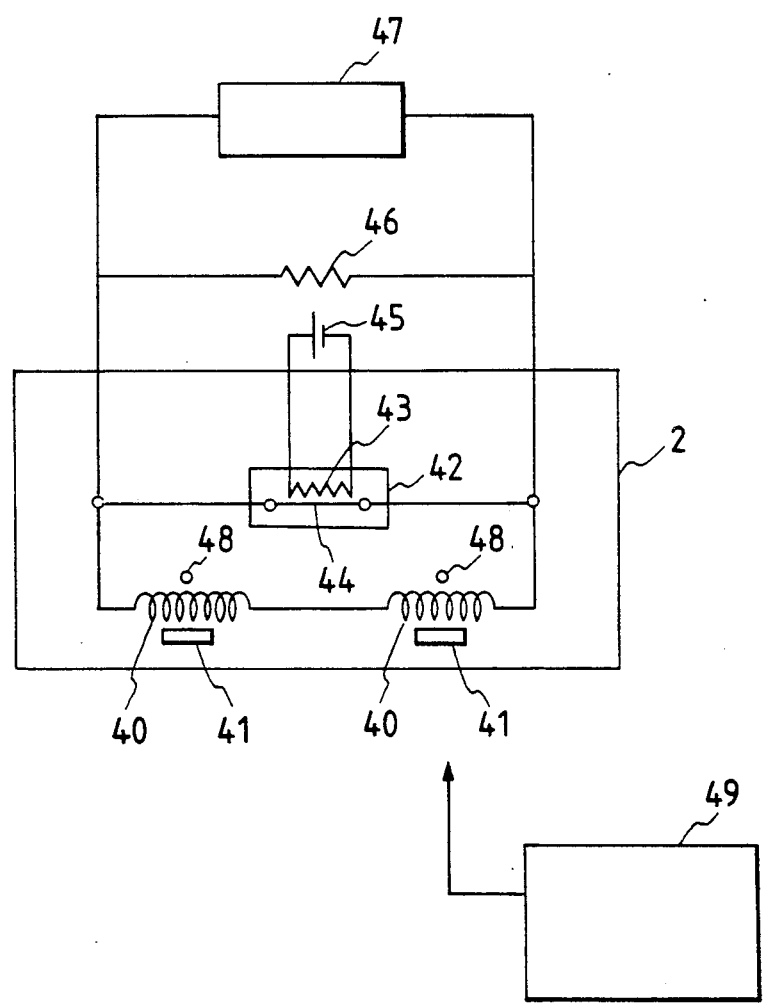
FIG. 6 is a circuit diagram showing a method of controlling a superconducting magnet according to the present invention.

FIG. 6 shows the circuit structure of the superconducting magnet 2 which enables the control over the stability margin of a superconducting magnet on the superconducting magnetic levitated train during high-speed travel. The superconducting magnet 2 assumes a permanent current mode between the two superconducting coils 40 and a permanent current switch 42' thereby generating a constant magnetic field during stationary travel. Each superconducting coil is provided with a detector 41 for detecting the magnitude of a disturbance. When the magnitude of the disturbance exceeds the limitation, the a power source 45 for a heater 43 of the permanent current switch 42 is made in accordance with the command from a centralized train control center 49, whereby a gate wire 44 of a permanent current switch 42 assumes a normal conductive state and the current applied to the coils is consumed by a resistor 46 on the train. When the coil current is lowered to a predetermined value, the power source 45 for the heater 43 is cut, whereby the permanent current mode is formed between the superconducting coils 40 and the permanent current switch 42. When the value of the current applied to the superconducting coils is increased, the coil current is increased in the state in which the permanent current state is cancelled by an auxiliary power source 47 provided on the train. When the coil current rises to a predetermined value, the power source 45 for the heater 43 is cut, whereby the permanent current mode is formed again between the superconducting coils 40 and the permanent current switch 42. The upper limit and the lower limit of the coil current are set at the values determined by the value of a magnetic field sensor 48 for detecting the magnetic flux density which is generated from each superconducting coil 40. In this embodiment, it is possible to vary the value of the coil current of the superconducting coil on the train which is driven in a permanent current mode in correspondence with the magnitude of a disturbance. That the value of the coil current is variable is equivalent to that the stability margin of the superconducting coil is variable. In this embodiment, it is possible to detect the magnitude of a disturbance and vary the speed of the train by varying the frequency of the propellant coil on the ground in accordance with the command from the centralized train control center 49 which is provided on the ground. That the train speed is variable is equivalent to that the disturbance of magnitude applied to the superconducting coil is variable. In any case, since it is possible to detect the magnitude of a disturbance and control the stability margin of the superconducting coil or the magnitude of the disturbance applied to the superconducting coil before the superconducting coil quenches, it is possible to continue levitation at a high speed without suddenly stopping the train due to quench.

In this embodiment, it is also possible to estimate the magnitude of a disturbance applied to the superconducting coil in accordance with the travelling pattern of the train and control the stability margin of the superconducting coil on the superconducting magnetic levitated train during high-speed travel or the magnitude of a disturbance applied to the superconducting coil by program control.

Figure 1:
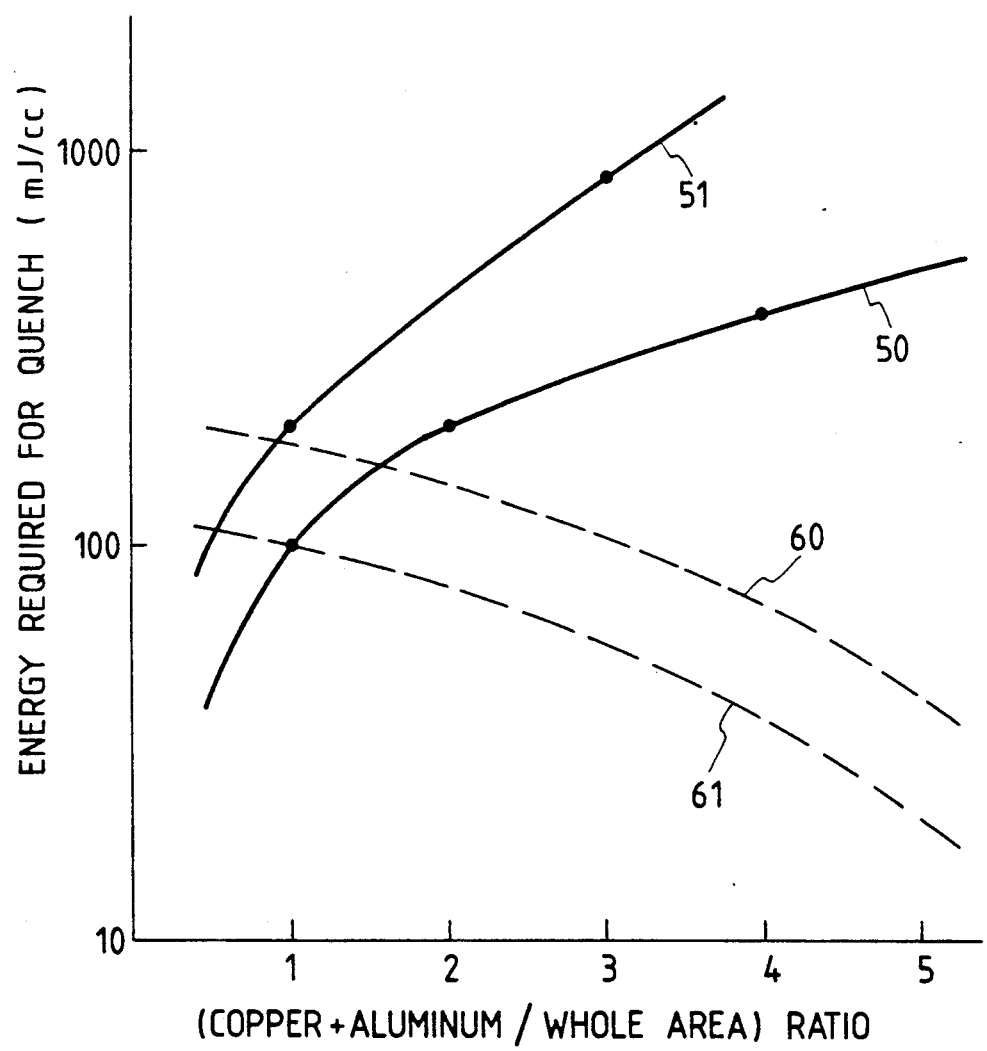
FIG. 1 shows the relationship between the stability margin and the disturbance energy exhibiting the advantage of the present invention.
Figure 2:
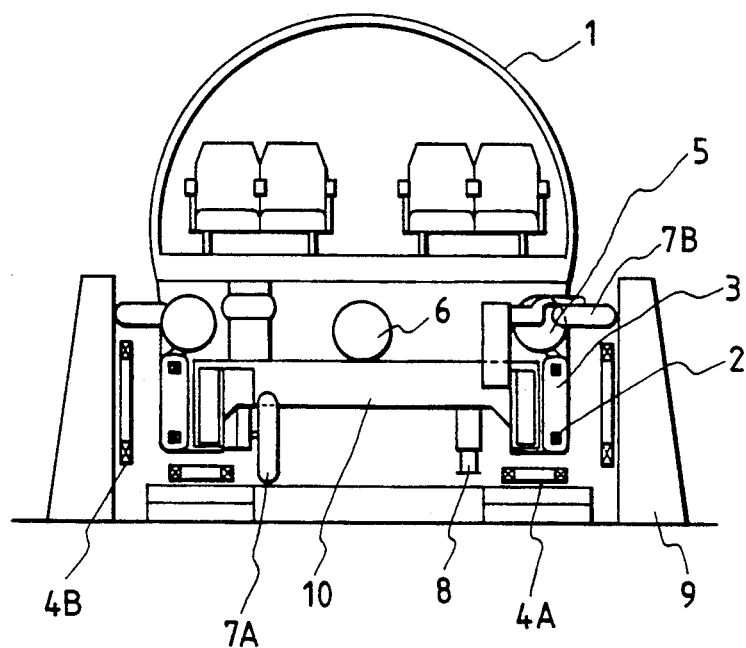
FIG. 2 is a cross sectional view of a superconducting magnetic levitated train.
Figure 3:
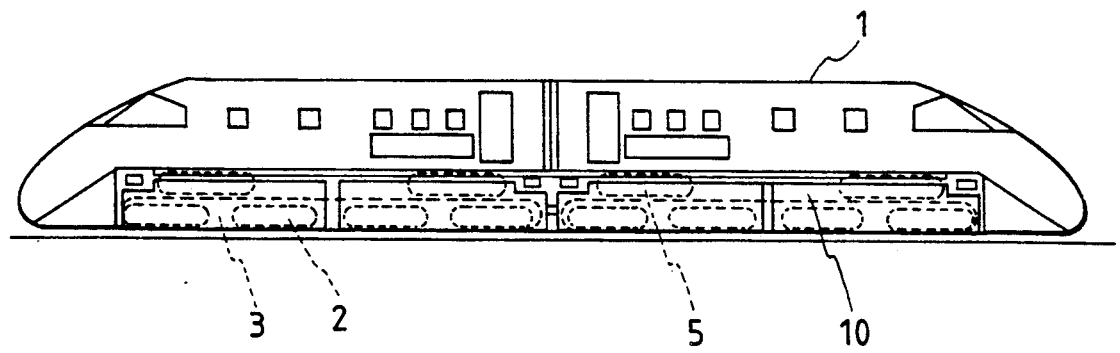

Superconducting coils having a sectional area similar to that of a superconducting coil for a superconducting magnetic levitated train were produced by varying the structure of a composite superconducting wire such as the copper ratio and the aluminum ratio. FIG. 1 shows the results of measurement of the stability margin of each of these superconducting coils to which a thermal disturbance was applied by the heater provided on the coil. The curve 50 shows the stability margin of a superconducting coil for a superconducting magnetic levitated train at the rated value which is composed of a coil of multifilamentary NbTi wire using only Cu as a stabilizing material, and the curve 51 shows the stability margin of a superconducting coil for a superconducting magnetic levitated train at the rated value which is composed of a coil of multifilamentary NbTi wire using a stabilizing material containing Cu and high-purity aluminum. From these results, it is obvious both in the curves 50 and 51 that when the copper ratio or the (copper+aluminum) ratio increases, the coil weight also increases and the current density of the coil as a whole is lowered, thereby lowering the levitation power. On the other hand, the disturbance energy applied to a superconducting coil for a superconducting magnetic levitated train can be inferred to be represented by the curves 60 and 61 in FIG. 1 from the operating tests on a line for traffic experiment. The curve 61 shows the maximum disturbance energy applied to the superconducting coil when the traveling speed of the train is 500 km/h and the curve 60 shows the maximum disturbance energy applied to the superconducting coil when the traveling speed of the train is 350 km/h.

To state the above results in more detail, in order that the superconducting coil is operated stably while the train is levitated at a speed of 500 km/h, a copper ratio of not less than 1.6 is necessary in a conventional superconducting coil having only Cu as a stabilizing material and a (copper+aluminum) ratio of not less than 0.9 is necessary in a superconducting coil which uses a composite of Cu and high-purity aluminum as a stabilizing material. It is naturally possible to vary the stability margin of the superconducting coil by varying the constitution of Cu and high-purity aluminum even if the (copper+aluminum) ratio is constant. However, multifilamentary NbTi wire having a low copper ratio which contains a higher ratio of high-purity aluminum factor cannot be produced by the present plastic working technique. The ratio of high-purity aluminum is therefore limited as a matter of fact.

In a superconducting magnetic levitated train having a plurality of connected cars, since the magnitude of a disturbance is different depending upon the position of the car, the superconducting wire used for a superconducting magnet which is mounted on a car suffering from a small disturbance may adopt a conventional multifilamentary NbTi wire having a copper ratio of 1.0 without producing any particular problem.

As described above, according to the present invention, a highly reliable superconducting magnetic levitated train is provided a superconducting magnet on which does not quench even if a superconducting magnetic levitated train is levitated at a high speed. This relates to the safety and the social reliability of a superconducting magnetic levitated train. Thus, a superconducting magnetic levitated train of the present invention is very advantageous in the new functional characteristics, the enhancement of the efficiency due to speedup, the economical efficiency, etc.

According to the embodiments of the present invention, if the stability margin of the superconducting magnet on the train is set at not less than 200 mJ/cc during the rated operation or the stationary disturbance energy applied to the superconducting magnet on the train is set at not more than 100 mJ/cc, it is possible to safely drive a superconducting magnetic levitated train at a super high speed with sufficient tolerance.

According to the embodiments of the present invention, since the stability margin of the superconducting magnet on the superconducting magnetic levitated train during high-speed travel or the magnitude of a disturbance applied to the superconducting magnet can be controlled by a centralized train control center provided on the ground, it is possible to safely drive the superconducting magnetic levitated train at a super high speed with efficiency.

While We have shown and described several embodiments in accordance with the present invention, it is understood that the same is not limited thereto but is susceptible to numerous changes and modifications as known to one of ordinary skill in the art, and We therefore do not wish to be limited to the details shown and described herein, but intend to cover all such modifications as are encompassed by the scope of the appended claims.

We claim:

1. A superconducting magnetic levitated train having a plurality of cars connected to each other, a group of superconducting magnets attached to the car trucks and a coil provided on the ground so that said superconducting magnetic levitated train is levitated by a magnetically induced repulsion between said superconducting magnets and said coil on the ground, characterized in that a superconducting magnet on a specified car has a predetermined stability margin which is larger than a stability margin of a superconducting magnet on another cars.

2. A superconducting magnetic levitated train having a plurality of cars including a lead car, a rearmost car and intermediate cars connected to each other, a group of superconducting magnets attached to car trucks at the respective connecting portions and a coil provided on the ground so that said superconducting magnetic levitated train is levitated by a magnetically induced repulsion between said superconducting magnets and said coil on the ground, characterized in that a superconducting magnet on the lead car and the rearmost car has a stability margin which is larger than the stability margin of a superconducting magnet on the intermediate cars.

3. In a superconducting magnetic levitated train system having a plurality of cars connected to each other, a group of superconducting magnets attached to car trucks at the respective connecting portions and a coil provided on the ground so that said superconducting magnetic levitated train is levitated at a high speed by a magnetically induced repulsion between said superconducting magnets and said coil on the ground, a superconducting magnetic levitated train characterized in that a stability margin of a superconducting magnet on the train is not less than 200 mJ/cc at a rated operation, and in that a stability margin of a superconducting magnet on at least one car is larger than the stability margin of a superconducting magnet on another car.

4. In a superconducting magnetic levitated train system having a plurality of cars connected to each other, a group of superconducting magnets attached to car trucks and a coil provided on the ground so that said superconducting magnetic levitated train is levitated by a magnetically induced repulsion between said superconducting magnets and said coil on the ground, a superconducting magnetic levitated train characterized in that a stability margin of superconducting magnet on at least one car is larger than a stability margin of superconducting magnet on another car, and in that a stationary disturbance energy applied to said superconducting magnet having a larger stability margin is not more than 100 mJ/cc.

5. In a superconducting magnetic levitated train system having a plurality of cars connected to each other, a group of superconducting magnets attached to car trucks at respective connecting portions and a coil provided on the ground so that said superconducting magnetic levitated train is levitated by the magnetically induced repulsion between said superconducting magnets and said coil on the ground, a superconducting magnetic levitated train characterized in that a superconducting magnet on a specified car adopts a superconducting coil of a composite superconducting wire stabilized by aluminum so that the stability margin of a superconducting magnet on at least one car is larger than a stability margin of a superconducting magnet on the another car.

6. A superconducting magnetic levitated train system having a plurality of cars connected to each other, a group of superconducting magnets attached to car trucks and a coil provided on the ground so that said superconducting magnetic levitated train is levitated by a magnetically induced repulsion between said superconducting magnets and said coil on the ground, said superconducting magnetic levitated train system comprising a control means for detecting a disturbance energy which, is different depending upon the position of a respective car and varying a stability margin of a superconducting magnet on at least one car in accordance with a detection signal so that said stability margin is larger than a stability margin of a superconducting magnet on another car.

7. A superconducting magnetic levitated train system having a plurality of cars connected to each other, a group of superconducting magnets attached to car trucks and a coil provided on the ground so that said superconducting magnetic levitated train is levitated by a magnetically induced repulsion between said superconducting magnets and said coil on the ground, characterized in that a stability margin of a superconducting magnet on at least one car is made larger than a stability margin of a superconducting magnet on another car, and in that a difference between the larger stability margin and a disturbance energy applied to said superconducting magnet having said larger stability margin is set at not less than 50 mJ/cc.

8. A superconducting magnetic levitated train system having a plurality of cars connected to each other, a group of superconducting magnets attached to car trucks and a coil provided on the ground so that said superconducting magnetic levitated train is levitated by a magnetically induced repulsion between said superconducting magnets and said coil on the ground, said superconducting magnetic levitated train system comprising a control means for making a stability margin of a superconducting magnet on a specified car larger than a stability margin of a superconducting magnet on another car, detecting a disturbance energy on a predetermined car and varying a stability margin of a superconducting magnet on at least one car in accordance with a detection signal.

9. A method of controlling a superconducting magnetic levitated train having a plurality of cars connected to each other, a group of superconducting magnets attached to car trucks at respective connecting portions and a coil provided on the ground so that said superconducting magnetic levitated train is levitated at a high speed by a magnetically induced repulsion between said superconducting magnets and said coil on the ground, said method comprising steps of:

detecting a driven state of a superconducting magnet on a specified car;

varying a current value in a permanent current mode by an auxiliary power source and a resistor; and varying and controlling a travelling conditions for said train so that a stability margin of a superconducting magnet on a specified car is changed in accordance with a command from a train control mean so as to vary the stability margin of the superconducting magnet on said specified car so that said stability margin is larger than a stability margin of a superconducting magnet on another car.

10. A method of controlling a superconducting magnetic levitated train having a plurality of cars connected to each other, a group of superconducting magnets attached to car trucks at respective connecting portions and a coil provided on the ground so that said superconducting magnetic levitated train is levitated by a magnetically induced repulsion between said superconducting magnets and said coil on the ground, said method comprising steps of:

detecting a magnitude of a disturbance energy of superconducting magnets on a specified car;

varying a current value in a permanent current mode by an auxiliary power source and a resistor; and controlling stability margins of said superconducting magnets by controlling the speed of said train in accordance with a command from a centralized train control center which is provided on the ground so as to vary a stability margin of a superconducting magnet of at least one car so that said stability of said at least one car is larger than a stability margin of a superconducting magnet on another car.

11. A superconducting coil for a superconducting magnetic levitated train according to claim 1, wherein said superconducting coil is a coil of a composite superconducting wire composed of multifilamentary NbTi wire having a low copper ratio with an outer surface thereof coated with thin high-purity aluminum.

12. A superconducting coil for a superconducting magnetic levitated train according to claim 1, wherein said superconducting coil is a coil of a composite superconducting wire composed of multifilamentary NbTi wire having a low copper ratio which accommodates high-purity aluminum at the central portion of a cross section thereof.

* * * * *